(12) United States Patent
Liao et al.

(10) Patent No.: US 10,341,949 B2
(45) Date of Patent: Jul. 2, 2019

(54) METHOD AND COMMUNICATION DEVICE OF BEACON RECEPTION

(71) Applicant: MEDIATEK INC., Hsin-Chu (TW)

(72) Inventors: Kuo-Chiang Liao, Hsinchu (TW);
Shen-Po Lin, Taichung (TW);
Ho-Chun Chiang, Hsinchu County (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/399,744

(22) Filed: Jan. 6, 2017

(65) Prior Publication Data
US 2018/0199285 A1 Jul. 12, 2018

(51) Int. Cl.
*H04W 52/02* (2009.01)
*H04L 29/08* (2006.01)

(52) U.S. Cl.
CPC ... *H04W 52/0216* (2013.01); *H04W 52/0229* (2013.01); *H04L 67/12* (2013.01); *Y02D 70/00* (2018.01); *Y02D 70/10* (2018.01); *Y02D 70/14* (2018.01); *Y02D 70/142* (2018.01); *Y02D 70/20* (2018.01); *Y02D 70/26* (2018.01)

(58) Field of Classification Search
CPC ............. H04W 52/04; H04W 52/0222; H04W 52/0225; H04W 52/028; H04W 24/02; H04W 72/048; G06F 1/3296
See application file for complete search history.

(56) References Cited

U.S. PATENT DOCUMENTS

| 2012/0314696 | A1* | 12/2012 | Liu ..................... | H04W 28/065 370/338 |
| 2013/0177000 | A1* | 7/2013 | Abraham ............... | H04W 28/06 370/338 |
| 2014/0003323 | A1* | 1/2014 | Liu ......................... | H04W 4/08 370/312 |
| 2015/0098459 | A1* | 4/2015 | Lee ....................... | H04W 48/14 370/338 |
| 2016/0323829 | A1* | 11/2016 | Zhang ............... | H04W 52/0225 |
| 2018/0152886 | A1* | 5/2018 | Naftali .............. | H04W 52/0229 |

* cited by examiner

*Primary Examiner* — Redentor Pasia
*Assistant Examiner* — Peter K Mak
(74) *Attorney, Agent, or Firm* — Oblon, McClelland, Maier & Neustadt, L.L.P.

(57) ABSTRACT

A method of beacon reception for a communication device in a wireless communication system is disclosed. The method comprises starting to receive a beacon from an access point (AP) of the wireless communication system, determining whether a specific element of the beacon is received, and determining whether to receive only a portion of the beacon according to the specific element.

12 Claims, 5 Drawing Sheets

METHOD AND COMMUNICATION DEVICE OF BEACON RECEPTION

BACKGROUND

Wi-Fi has become a very important feature in modern electronic devices, including smart phones, tablets, wearable devices, Internet of Things (IOT) devices, notebooks, PCs, etc. Wi-Fi can provide the cheaper and faster internet experience than others. But for the long coverage and high throughput, Wi-Fi consumes more power. For longer battery life, many low power mechanisms are provided for different user scenarios.

To save power consumption, communication devices (e.g. Wi-Fi stations) generally keep in low power mode (e.g. Wi-Fi power saving mode (PSM)), and have to wake up to receive beacon for every 102.4 ms (i.e. beacon interval) by a target beacon transmission time (TBTT) timer, so that Wi-Fi stations (STAs) will not miss data sent from the access point (AP). In addition, a delivery traffic indication map (DTIM) bit is set by the AP in the beacon to notify a specific Wi-Fi STA of buffered data. Therefore, the Wi-Fi device turns the radio frequency (RF) antenna on for receiving buffered data from the AP when the DTIM bit of the beacon is set to "1", whereas the Wi-Fi device/STA does not turn the RF antenna on when the DTIM bit is set to "0".

Refer to FIG. 1, which is a schematic diagram of current consumption of a Wi-Fi station in power saving mode according to the prior art. In FIG. 1, the Wi-Fi station in sleep period "A" does not perform beacon reception, consuming less current, and in wake-up period "F" performs beacon reception, which has the highest power consumption during the power saving mode. As shown in FIG. 1, the longer the beacon reception time (i.e. the period "F") is, the more the power consumption is. In addition, refer to FIG. 2, which is a schematic diagram of a beacon service period F according to the prior art. In general, right after the TBTT timer expires, the beacon is transmitted from the AP. However, if the channel is busy, the beacon transmission will be delayed. Thus, the Wi-Fi station has to stay awake longer for receiving the beacon and therefore consumes more power. Moreover, if a length of the beacon is longer, the Wi-Fi station will spend more time on receiving the entire beacon, which also costs more power.

Accordingly, how to improve the power consumption in power saving mode is a very important target for battery life extension.

SUMMARY

It is therefore an objective to provide a method of beacon reception, to save more power and extend battery life.

The present invention discloses a method of beacon reception for a communication device in a wireless communication system. The method comprises starting the beacon reception to receive a beacon from an access point (AP) of the wireless communication system, determining whether a specific element of the beacon is received, and determining whether to receive only a portion of the beacon according to the specific element.

The present invention discloses a communication device of a wireless communication system for handling beacon reception. The communication device comprises a storage unit for storing program code corresponding to a process, and a processing unit coupled to the storage unit, for processing the program code to execute the process, wherein the process comprises: starting the beacon reception to receive a beacon from an access point (AP) of the wireless communication system, determining whether a specific element of the beacon is received, and determining whether to receive only a portion of the beacon according to the specific element.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
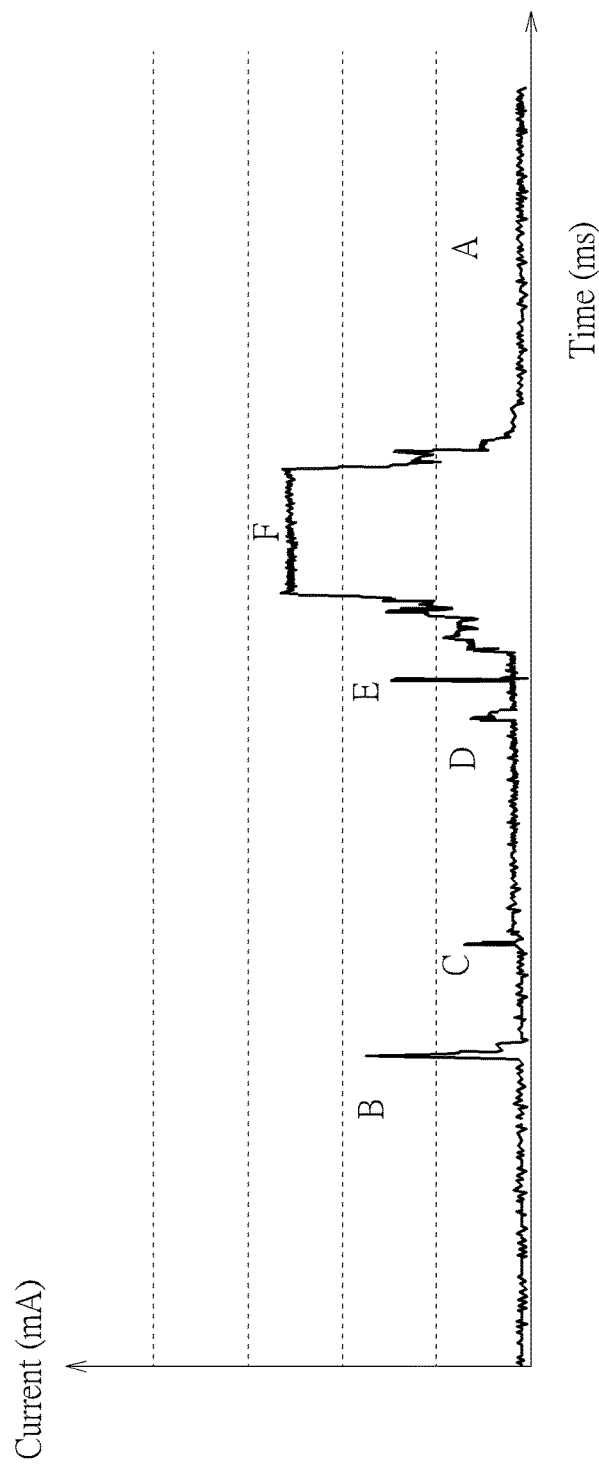
FIG. 1 is a schematic diagram of current consumption of a Wi-Fi station in a power saving mode according to the prior art.
Figure 2:
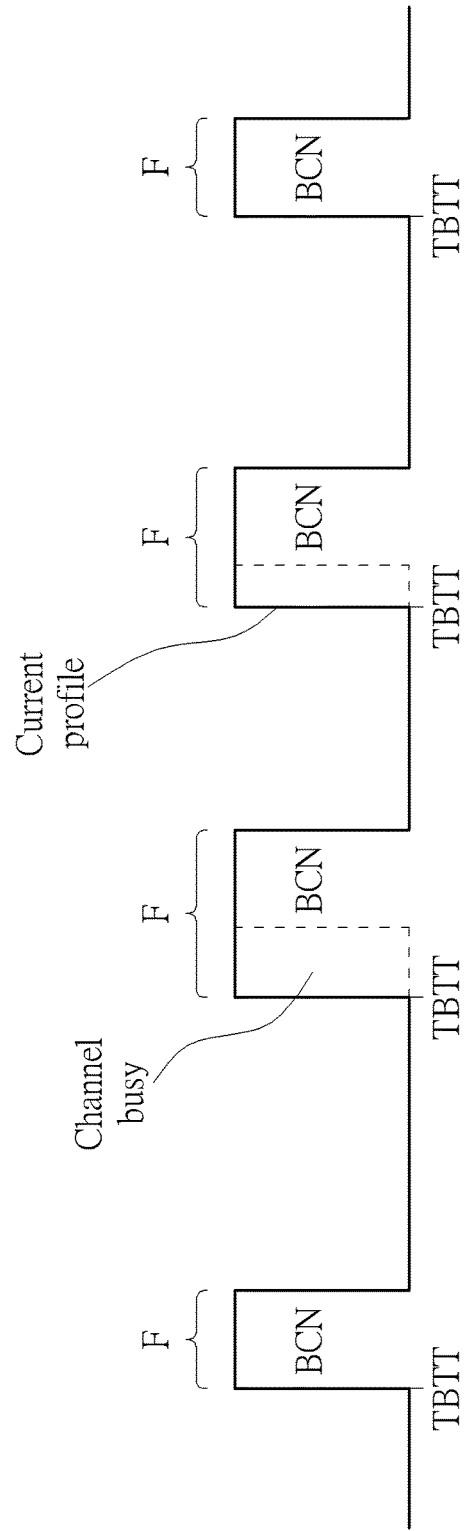
FIG. 2 is a schematic diagram of a beacon service period according to the prior art.
Figure 3:
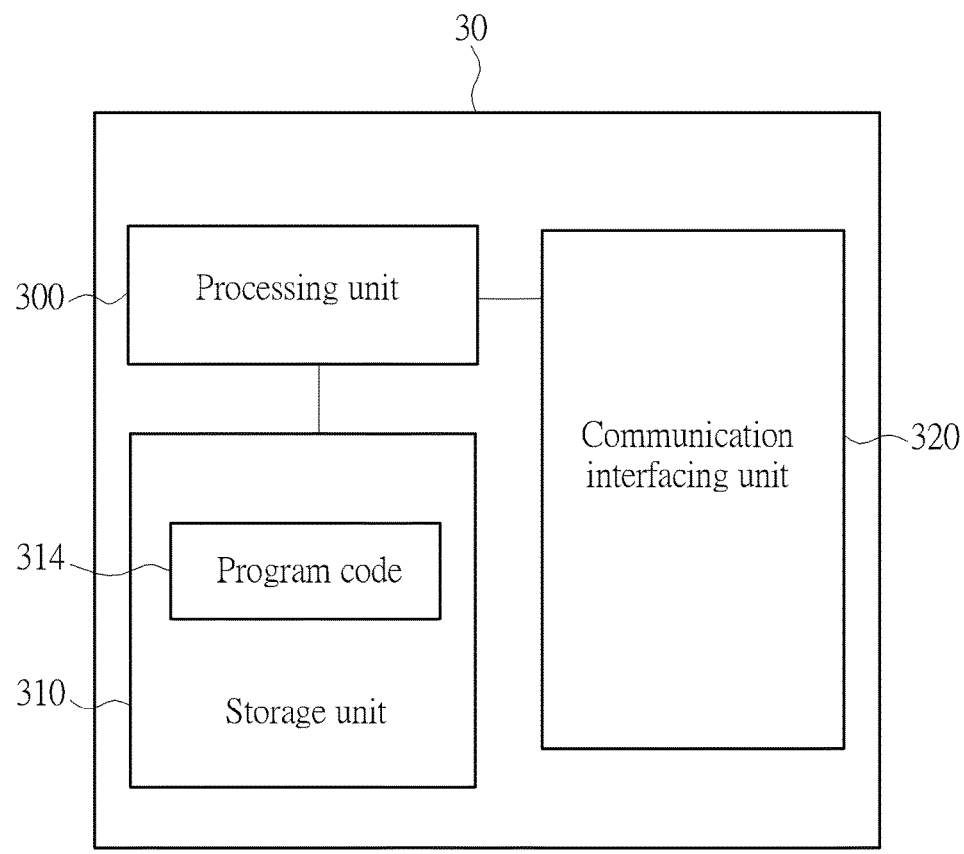
FIG. 3 is a schematic diagram of an exemplary communication device according to the present disclosure.

FIG. 3 illustrates a schematic diagram of an exemplary communication device 30. The communication device 30 can be a Wi-Fi station, such as wearable devices, IoT devices, mobile phones, appliances, machine type devices, etc. compatible with Wi-Fi specification. The communication device 30 may include a processing unit 300 such as a processor, Application Specific Integrated Circuit (ASIC), etc., a storage unit 310 and a communication interfacing unit 320. The storage unit 310 may be any data storage device that can store program code 314 corresponding to a process, for access by the processing unit 300. The processing unit 300 may be coupled to the storage unit 310, for processing the program code 314 to execute the process. Examples of the storage unit 310 include but are not limited to a read-only memory (ROM), flash memory, random-access memory (RAM), CD-ROMs, magnetic tape, hard disk, and optical data storage device. The communication interfacing unit 320 may be a radio transceiver and can exchange wireless signals according to processing results of the processing unit 300.

Figure 4:
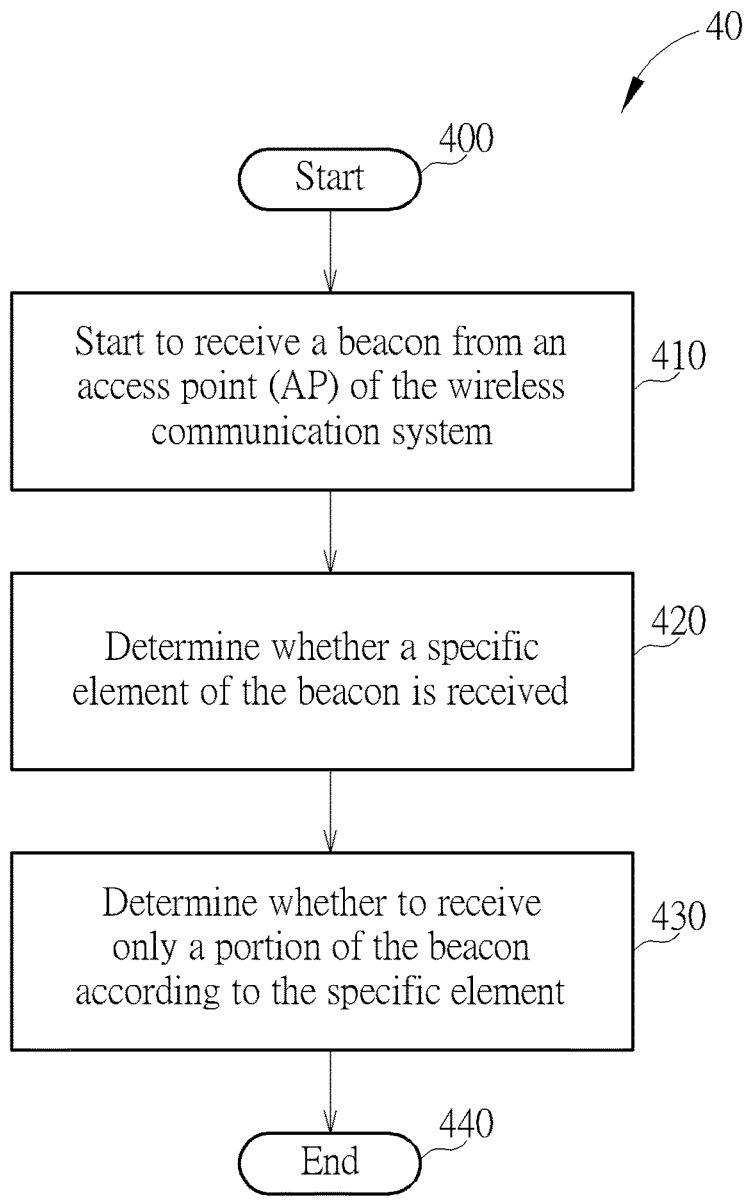
FIG. 4 is a flowchart of an exemplary process according to the present disclosure.

Please refer to FIG. 4, which is a flowchart of a process 40 according to an example of the present disclosure. The process 40 may be utilized in a communication device (e.g. Wi-Fi station) for beacon reception. The process 40 may be compiled into the program code 314 to be stored in the storage unit 310 for being processed by the processing unit 300, and may include the following steps:

Step 400: Start.

Step 410: Start to receive a beacon from an access point (AP) of the wireless communication system.

Step 420: Determine whether a specific element of the beacon is received.

Step 430: Determine whether to receive only a portion of the beacon according to the specific element.

Step 440: End.

According to the process 40, the communication device may determine whether to receive a portion of the beacon or an entirety of the beacon according to a specific element in the currently received beacon. The specific element may include a traffic indication map (TIM), a channel switch announcement, etc. For example, when the specific element (e.g. TIM information element (IE)) of the beacon is received, the communication device may terminate beacon reception and therefore receives only a portion of the beacon, to shorten the beacon reception time for power saving.

Referring back to FIG. 3, the communication interfacing unit 320 of the communication device 30 may perform beacon reception in a wake-up period to receive a beacon from an access point (AP) of the wireless communication system. The processing unit 300 may process the portion of beacon received by the communication interfacing unit 320 to determine whether a specific element of the beacon is received. The processing unit 300 may also determine whether to receive only a portion of the beacon according to the specific element. If the specific element is received and/or it is determined to receive only the portion of the beacon, the processing unit 300 may notify the communication interfacing unit 320 to terminate the beacon reception. If the specific element is not received, the communication interfacing unit 320 may continue the beacon reception until end of the wake-up period.

In another embodiment, the communication device (e.g. Wi-Fi station) may check the value of the specific element (e.g. TIM IE), to determine the value is the same as or different from the value of the specific element of a previously received beacon. If a first value of the specific element of the currently received beacon is the same as a second value of the specific element of the previously received beacon, the communication device may determine to receive only the portion of the beacon. The communication device may therefore terminate the beacon reception to save power.

When it is determined to receive only a portion of the beacon (namely partial beacon reception), the communication device may not perform a cyclic redundancy check (CRC) on the portion of the beacon. In addition, the communication device may enter a sleep mode after terminating the beacon reception. Besides, the communication device may receive an entirety of a beacon after receiving only a portion of a beacon for a predetermined number of times, so as to avoid data loss.

On the other hand, if the first value of the specific element of the beacon is different from the second value of the specific element of the previously received beacon, the communication device may determine to receive an entirety of the beacon, and therefore continuously receives the beacon.

Figure 5:
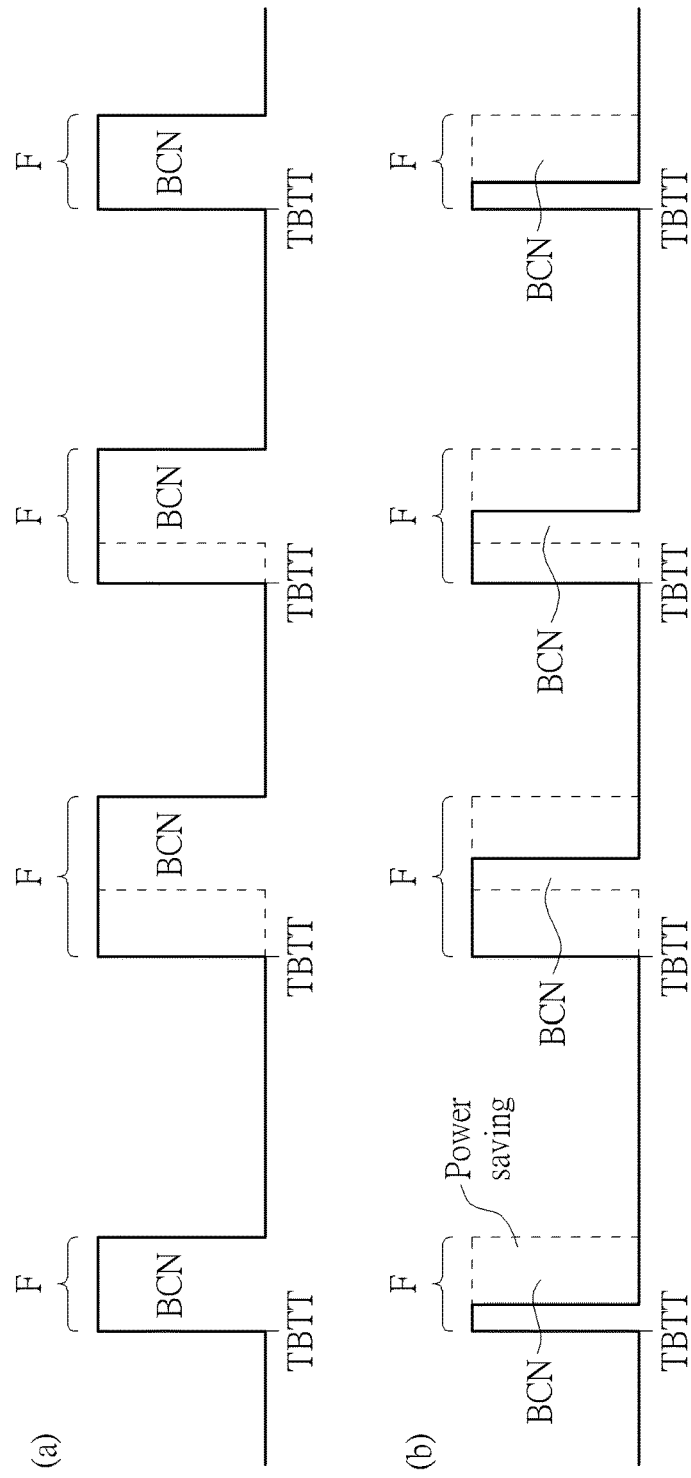
FIG. 5 is a schematic diagram of partial beacon reception according to the present disclosure.

Refer to FIG. 5, which is a schematic diagram of a partial beacon reception according to the present disclosure. As shown in FIG. 5, compared to receiving an entirety of the beacon (namely full beacon reception) (a), the present invention can save more power by partial beacon reception (b). That is, communication device (e.g. the Wi-Fi station) may spend less time for beacon reception, so that the length of the wake-up period (marked as "F") is shorten, so as to reduce the power consumption. The wake-up period can be a beacon service period.

The specific element (e.g. TIM IE) of the beacon transmitted from different APs may be located at different positions of the beacon. For example, the TIM IE of a beacon transmitted from a first AP may be located at 62 us of a 226 us long beacon. While the TIM IE of a beacon transmitted from a second AP may be located at 64 us of a 321 us long beacon. Anyhow, the communication device may not need to receive the entirety of the beacon to obtain the specific element. Besides, when the value of the specific element of current beacon is the same as the value of the specific element of the previous beacon, which may indicate the rest of the current beacon is not different from the previous beacon, the communication device may not need to receive the entirety of the beacon to obtain the content. Therefore, the communication device (e.g. the media access control (MAC) layer of Wi-Fi station) may enter the sleep mode after receiving the specific element (e.g. TIM IE), to save power. As can be seen, with partial beacon reception functionality, power consumption of communication device can be greatly reduced, so as to extend the battery life of the communication device.

The abovementioned steps of the processes including suggested steps can be realized by means that could be a hardware, a firmware known as a combination of a hardware device and computer instructions and data that reside as read-only software on the hardware device or an electronic system. Examples of hardware can include analog, digital and mixed circuits known as microcircuit, microchip, or silicon chip. Examples of the electronic system can include a system on chip (SOC), system in package (SiP), a computer on module (COM) and the communication device 30.

In conclusion, the present invention provides partial beacon reception functionality in communication device, so that the beacon reception time for the communication device can be shorten for saving power. In addition, the communication device may receive an entirety of the beacon for avoiding important information loss after several partial beacon receptions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of beacon reception for a communication device in a wireless communication system, the method comprising:

starting to receive, by a communication circuit of the communication device, a beacon from an access point (AP) of the wireless communication system;

obtaining a specific element of the beacon from a received portion of the beacon;

determining, by a processing circuit of the communication device, whether to terminate receiving the beacon before reception thereof is completed according to the obtained specific element, including when a first value of the specific element of the beacon is the same as a second value of a specific element of a previously received beacon, determining to terminate receiving the beacon before the reception thereof is completed, except after the communication device having determined to terminate receiving other beacons, which include specific elements having values the same as the first value, before the completion thereof for a predetermined number of times, and determining to receive an entirety of the beacon to avoid data loss after the communication device having determined to terminate receiving the other beacons, which include the specific elements having the values the same as the first value, before the completion thereof for the predetermined number of times; and causing, by the processing circuit of the communication device, the communication circuit of the communication device to receive the entirety of the beacon or to terminate receiving the beacon before the reception thereof is completed according to a result of the determining whether to terminate receiving the beacon before the reception thereof is completed.

2. The method of claim 1, wherein the determining whether to terminate receiving the beacon before the reception thereof is completed according to the specific element comprises:
determining to receive the entirety of the beacon when the first value of the specific element of the beacon is different from the second value of the specific element of the previously received beacon.

3. The method of claim 1, further comprising:
entering a sleep mode after terminating receiving the beacon before the reception thereof is completed.

4. The method of claim 1, further comprising:
performing no cyclic redundancy check (CRC) on the received portion of the beacon when determining to terminate receiving the beacon before reception thereof is completed.

5. The method of claim 1, wherein the specific element includes at least one of a Traffic indication map (TIM) and a channel switch announcement.

6. The method of claim 1, further comprising:
in response to determining to terminate receiving the beacon before the reception thereof is completed, entering a sleep mode without receiving a remaining portion of the beacon.

7. A communication device of a wireless communication system, comprising:
a storage device configured to store program code corresponding to a process; and
a processing circuit coupled to the storage device and configured to execute the program code to perform the process,
wherein the process comprises:
starting to receive a beacon from an access point (AP) of the wireless communication system;
obtaining a specific element of the beacon from a received portion of the beacon;
determining whether to terminate receiving the beacon before reception thereof is completed according to the obtained specific element, including
when a first value of the specific element of the beacon is the same as a second value of a specific element of a previously received beacon,
determining to terminate receiving the beacon before the reception thereof is completed, except after the communication device having determined to terminate receiving other beacons, which include specific elements having values the same as the first value, before the completion thereof for a predetermined number of times, and
determining to receive an entirety of the beacon to avoid data loss after the communication device having determined to terminate receiving the other beacons, which include the specific elements having the values the same as the first value, before the completion thereof for the predetermined number of times; and
causing the communication device to receive the entirety of the beacon or to terminate receiving the beacon before the reception thereof is completed according to a result of the determining whether to terminate receiving the beacon before the reception thereof is completed.

8. The communication device of claim 7, wherein the determining whether to terminate receiving the beacon before the reception thereof is completed according to the specific element comprises:
determining to receive the entirety of the beacon when the first value of the specific element of the beacon is different from the second value of the specific element of the previously received beacon.

9. The communication device of claim 7, wherein the process further comprises:
entering a sleep mode after terminating receiving the beacon before the reception thereof is completed.

10. The communication device of claim 7, wherein the process further comprises:
performing no cyclic redundancy check (CRC) on the received portion of the beacon when determining to terminate receiving the beacon before the reception thereof is completed.

11. The communication device of claim 7, wherein the specific element includes at least one of a Traffic indication map (TIM) and a channel switch announcement.

12. The communication device of claim 7, wherein the process further comprises:
in response to determining to terminate receiving the beacon before the reception thereof is completed, entering a sleep mode without receiving a remaining portion of the beacon.

* * * * *